United States Patent [19]

Pitts et al.

[11] 3,759,916
[45] Sept. 18, 1973

[54] PROCESS FOR TRIMERIZING POLYISOCYANATES WITH PYRAZINE CATALYSTS

[75] Inventors: James J. Pitts, Wallingford; John S. Babiec, Jr., Milford, both of Conn.

[73] Assignee: Olin Corporation, New Haven, Conn.

[22] Filed: Mar. 27, 1972

[21] Appl. No.: 238,661

[52] U.S. Cl. 260/77.5 NC, 260/2.5 AW, 260/268 BC
[51] Int. Cl. .................. C08g 22/36, C08g 22/44
[58] Field of Search ............ 260/77.5 NC, 268 BC, 260/2.5 AW, 75 NC, 77.5 AC, 2.5 AC

[56] References Cited
UNITED STATES PATENTS

| | | | |
|---|---|---|---|
| 2,345,237 | 3/1944 | Chitwood et al. | 260/268 |
| 2,993,870 | 7/1961 | Burkus | 260/2.5 |
| 3,001,973 | 9/1961 | Piepenbrink et al. | 260/75 |
| 3,619,338 | 11/1971 | Gilman et al. | 161/93 |
| 3,666,593 | 5/1972 | Lee | 156/285 |

*Primary Examiner*—Donald E. Czaja
*Assistant Examiner*—H. S. Cockeram
*Attorney*—F. A. Iskander et al.

[57] ABSTRACT

A process for trimerizing organic polyisocyanates using selected pyrazine compounds as catalysts. The trimers produced are useful in the preparation of polyurethane resins.

9 Claims, No Drawings

PROCESS FOR TRIMERIZING POLYISOCYANATES WITH PYRAZINE CATALYSTS

This invention relates to a catalytic process for the trimerization of organic polyisocyanates employing selected pyrazine compounds as the catalysts.

The trimerization of organic polyisocyanates to form isocyanurates is known, as is the use of isocyanates to prepare polyurethane resins wherein a portion of the isocyanate groups are in the trimerized form. Polyurethane resins containing a portion of the isocyanate groups as isocyanurates have improved stability to heat and light as well as reduced toxicity and volatility. These improved properties are valuable in the preparation of numerous types of commercial products, for example, polyurethane coatings, elastomers and flexible and rigid foams.

In the process for trimerizing organic polyisocyanates, many catalysts have been disclosed, for example, tertiary amines such as tetrazoles, N,N'-dialkylpiperazine, pyridines substituted by alkoxy and amino groups and alkylene imines as well as other types of catalysts such as lead ethylhexoate, calcium naphthenate and alkali metal salts of carboxylic acids. See, for example, U.S. Pats. Nos. 3,252,945; 2,979,485 or 2,954,365. While these prior art catalysts do exert a catalytic effect in the polyisocyanate trimerization reaction, they have not been entirely satisfactory as the reaction rates which they elicit are often very slow and many require the presence of co-catalysts or the use of elevated temperatures. Other catalysts which have been utilized contain reactive groups which produce undesired side-reactions in various applications in which the trimer products are used, for example, the production of polyurethane foam.

Now it has been found according to the process of the invention that organic polyisocyanates can be rapidly trimerized to form isocyanurate structures in the presence of selected pyrazines as the trimerization catalysts.

Any organic polyisocyanate, including pure and crude compositions, which is susceptible to trimerization can be used in practicing the process of this invention. These include alkyl and aryl polyisocyanates having one to 10 carbon atoms and cycloalkyl, aralkyl and alkaryl polyisocyanates having one to 30 carbon atoms. Typical examples include ethylene diisocyanate, hexamethylene diisocyanate, tolylene diisocyanate, phenylene diisocyanate, methylene bis(cyclohexylisocyanate), cyclohexylene diisocyanate, naphthalene diisocyanate, tolyl triisocyanate, methane tris(phenylisocyanate) including all isomers and mixtures thereof.

The catalysts used in the process of the present invention are compounds of the formula:

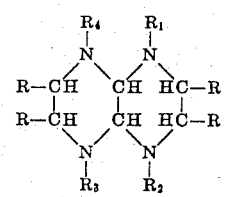

I wherein each of R, $R_1$, $R_2$, $R_3$, and $R_4$ is independently H or a lower alkyl having one to four carbon atoms.

Preferred are pyrazine compounds of formula I wherein R is H and each of $R_1$, $R_2$, $R_3$ and $R_4$ is a lower alkyl having one to four carbon atoms, and more preferably one to three carbon atoms. Typical examples are 1,4,5,8-tetramethylhexahydropyrazino [2,3-b] pyrazine; 1,4,5,8-tetraethylhexahydropyrazino [2,3-b] pyrazine; 1,4,5,8-tetrapropylhexahydropyrazino [2,3-b] pyrazine; 1,8-dimethyloctahydropyrazino [2,3-b] pyrazine; 4,5-diethyloctahydropyrazino [2,3-b] pyrazine or mixtures thereof.

The pyrazine catalysts used in this invention are well-known compounds and can be synthesized, for example, by the method described in U.S. Pat. No. 2,345,237 from inexpensive, commercially available starting materials.

The process of this invention is carried out by mixing a catalytic amount of the substituted pyrazine with the polyisocyanate to be trimerized. The exact amount of catalyst required varies with the particular polyisocyanate, the trimerization temperature, and rate and extent of trimerization required. However, usually an amount ranging from about 0.001 to about 5.0 percent, and preferably from about 0.004 to about 3.5 percent of catalyst, based on the weight of the polyisocyanate is effective in bringing about the trimerization reaction.

The pyrazine catalysts of the present invention are active at any suitable temperature such as from about −10° to about 200°C. A temperature range of about 0° to about 80°C. is preferred. As the trimerization is highly exothermic cooling may have to be used in order to maintain the temperature of the reactive mixture within the above-indicated ranges.

The catalysts of the present invention are preferably used alone with the organic isocyanate to be trimerized. However, if desired, they may be used in conjunction with a co-catalyst, for example, an oxirane compound such as propylene oxide or a phenol or substituted phenol.

The reaction can be carried out in the absence or presence of an inert solvent. By "inert" is meant that the solvent does not contain any reactive moieties which may interfere with the trimerization reaction. Typical examples include Cellosolve acetate, ethyl acetate, butyl acetate, acetone, methyl ethyl ketone, methyl isobutyl ketone, ethyl ether, dioxane, benzene, toluene, xylene, and dimethylformamide.

The trimerization of an organic polyisocyanate proceeds with the formation of a gel occurring, which indicates the formation of isocyanurate radicals. Since the reduction in isocyanate groups is substantially equal to the weight of the isocyanurate radicals formed, the extent to which trimerization has occurred can easily be determined by measuring the loss in free isocyanate groups. The extent to which isocyanurate formation is allowed to proceed can be readily controlled by the addition of an acid or acid halide which terminates the reaction. Acids and acid halides which may be used include, for example, hydrochloric acid and phosphoric acid or phosgene, acetyl chloride and benzoyl chloride and the like.

Employing the catalysts of this invention, trimerization of isocyanate groups produces compositions containing isocyanurate groups,

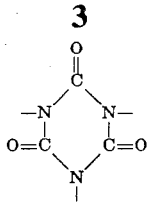

wherein the free valence is through the nitrogen atoms to an organic radical, as distinguished from compounds containing cyanurate groups,

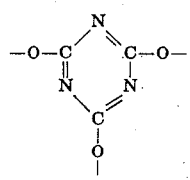

wherein the free valence is through a free oxygen atom to an organic radical.

Employing the catalysts of the present invention provides a process in which a highly effective, single catalyst is employed in relatively small amounts in the trimerization of organic polyisocyanates at ambient temperatures and in the absence of undesirable side reactions. These catalysts, furthermore, can be readily prepared from low cost, commercially available materials.

Using the process of this invention, polyisocyanate trimers are prepared having utility in applications as components in, for example, polyurethane elastomers, adhesives and flexible and rigid foams. Trimerized polyisocyanates provide increased thermal stability, greater cross-link density and rigidity, thus enhancing, for example, the physical properties of commercially produced rigid polyurethane foams.

EXAMPLE I

An amount of 12.2 g. of a mixture of tolylene diisocyanate isomers (80 percent 2,4; 20 percent 2,6-) was homogeneously admixed with 0.2 g. of 1,4,5,8-tetramethylhexahydropyrazino [2,3-b] pyrazine. The catalyst amount was 1.6 percent by weight, based on the weight of polyisocyanate A highly exothermic reaction took place wherein a change in color from clear to yellow and the formation of a non-flowing solid occurred within a few minutes. The gelation time was clocked to be 4 minutes. The solid resinous product was ground to a fine powder and an infrared spectrum obtained. Confirmation of the presence of a large amount of trimer isocyanurate was shown by bands at 5.85 μ (C=O) and 7.1 μ. The presence of free N=C=O groups was indicated by a band at 4.45 μ with only small amounts being present of uretidine dione at 5.65 μ and carbodiimide at 4.65 μ.

COMPARATIVE TESTS I-III

Using the exact procedure of Example I, the trimerization reaction for the mixture of tolylene diisocyanate isomers was attempted in the presence of three prior art trimerization catalysts which were used in the same proportion as the catalyst employed in Example I. In Comparative Test I, 1,4-dimethylpiperazine was employed as the catalyst in place of the catalyst of Example I. 1,3,5-Trimethyltrihydrotriazine was used as the catalyst in Comparative Test II and 4-dimethylaminoethyl-1-methylpiperazine was used in Comparative Test III. Gelation time was clocked in the case of each catalyst. The results are provided in Table 1 below.

TABLE 1

| | Catalyst Used | Gelation Time (Minutes) |
|---|---|---|
| Example I | 1,4,5,8-Tetramethylhexahydropyrazino[2,3-b]pyrazine | 4 |
| Comp. Test I | 1,4-Dimethylpiperazine | >1080 |
| Comp. Test II | 1,3,5-Trimethyltrihydrotriazine | 210 |
| Comp. Test III | 4-Dimethylaminoethyl-1-methyl piperazine | >1080 |

The above results show the highly increased rate of activity of the catalysts of the present invention in the trimerization reaction.

What is claimed is:

1. The process of trimerizing organic polyisocyanates in the presence of a catalyst, the catalyst being a pyrazine compound of the formula:

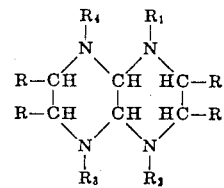

wherein each of R, $R_1$, $R_2$, $R_3$ and $R_4$ is independently hydrogen or a lower alkyl having from one to four carbon atoms.

2. The process of claim 1 wherein R is hydrogen and each of $R_1$, $R_2$, $R_3$ and $R_4$ is a lower alkyl having one to four carbon atoms.

3. The process of claim 2 wherein said catalyst is selected from the group consisting of 1,4,5,8-tetramethylhexahydropyrazino [2,3-b] pyrazine; 1,4,5,8-tetraethylhexahydropyrazino [2,3-b] pyrazine; 1,4,5,8-tetrapropylhexahydropyrazino [2,3-b] pyrazine; 1,8-dimethyloctahydropyrazino [2,3-b] pyrazine; and 4,5-diethyloctahydropyrazino [2,3-b] pyrazine.

4. The process of claim 3 wherein said catalyst is employed in an amount of about 0.001 to about 5.0 percent by weight based on the weight of said organic polyisocyanate.

5. The process of claim 4 wherein said trimerization is carried out at a temperature from about −10° to about 200°C.

6. The process of claim 5 wherein said catalyst is employed in an amount of about 0.004 to about 3.5 percent by weight based on the weight of said organic polyisocyanate.

7. The process of claim 6 wherein said organic polyisocyanate is tolylene diisocyanate.

8. The process of claim 7 wherein said trimerization is carried out at a temperature of about 0° to about 80°C.

9. The process of claim 8 wherein said catalyst is 1,4,5,8-tetramethylhexahydropyrazino [2,3-b] pyrazine.

* * * * *